US011568071B2

(12) United States Patent
Ogura et al.

(10) Patent No.: US 11,568,071 B2
(45) Date of Patent: Jan. 31, 2023

(54) INFORMATION PROVISION APPARATUS AND INFORMATION PROVISION METHOD

(71) Applicant: FUJITSU LIMITED, Kawasaki (JP)

(72) Inventors: Takao Ogura, Yokohama (JP); Hisashi Kojima, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 258 days.

(21) Appl. No.: 16/520,307

(22) Filed: Jul. 23, 2019

(65) Prior Publication Data
US 2020/0042727 A1  Feb. 6, 2020

(30) Foreign Application Priority Data

Aug. 6, 2018  (JP) ............... JP2018-147830

(51) Int. Cl.
G06F 21/62  (2013.01)
H04W 12/50  (2021.01)
H04W 88/02  (2009.01)

(52) U.S. Cl.
CPC ........ G06F 21/6209 (2013.01); G06F 21/629 (2013.01); G06F 21/6254 (2013.01); H04W 12/50 (2021.01); H04W 88/02 (2013.01)

(58) Field of Classification Search
CPC ............. G06F 21/6209; G06F 21/6254; G06F 21/629; H04W 12/50; H04W 88/02
See application file for complete search history.

(56) References Cited

U.S. PATENT DOCUMENTS

| 7,016,863 | B1* | 3/2006 | Kamakura | G06Q 30/0232 |
| | | | | 705/26.42 |
| 7,912,971 | B1* | 3/2011 | Dunn | H04L 63/102 |
| | | | | 709/229 |
| 10,523,736 | B2* | 12/2019 | Wang | G06Q 50/01 |
| 11,042,668 | B1* | 6/2021 | Kassam-Adams | G06F 21/572 |
| 2003/0023678 | A1* | 1/2003 | Rugelj | G07G 1/0036 |
| | | | | 709/203 |

(Continued)

FOREIGN PATENT DOCUMENTS

JP  2017-151942  8/2017

OTHER PUBLICATIONS

Sarwate et al. "Sharing privacy-sensitive access to neuroimaging and genetics data: a review and preliminary validation." Frontiers in neuroinformatics vol. 8 Article 35. 2014. p. 1-12 (Year: 2014).*

Primary Examiner — Carl G Colin
Assistant Examiner — Zhe Liu
(74) Attorney, Agent, or Firm — Fujitsu Patent Center

(57) ABSTRACT

An information provision apparatus includes a memory configured to store personal data for each user, and a processor coupled to the memory and configured to in response to receiving a request for first personal data of a first user from a terminal device, determine difference between first data stored in the memory as the first personal data at a first time of receiving the request and second data stored in the memory as the first personal data at a second time before the first time, provision of the second data being permitted, perform, in accordance with the difference, determination of whether provision of the first data is permitted, and when it is determined that the provision of the first data is permitted, transmit the first data to the terminal device.

11 Claims, 14 Drawing Sheets

(56) References Cited

U.S. PATENT DOCUMENTS

| | | | |
|---|---|---|---|
| 2003/0047602 A1* | 3/2003 | Iida | G07F 7/1025 |
| | | | 235/382 |
| 2010/0186066 A1* | 7/2010 | Pollard | G06Q 30/0603 |
| | | | 726/3 |
| 2010/0317323 A1* | 12/2010 | Facemire | H04L 63/107 |
| | | | 455/411 |
| 2016/0225000 A1* | 8/2016 | Glasgow | G06Q 30/0207 |
| 2016/0232376 A1* | 8/2016 | Abbott | G06F 21/6254 |
| 2017/0353482 A1* | 12/2017 | Sommer | H04L 63/20 |
| 2018/0232528 A1* | 8/2018 | Williamson | G06N 20/00 |
| 2019/0213354 A1* | 7/2019 | Bhowan | G06F 40/30 |
| 2020/0342123 A1* | 10/2020 | Nadler | H04L 63/0407 |
| 2021/0019763 A1* | 1/2021 | Helles | H04L 9/3239 |
| 2021/0149982 A1* | 5/2021 | Jones | G06F 16/951 |

\* cited by examiner

| USER ID | DATA TYPE | DATA PROVISION DESTINATION | APPROVAL ACQUISITION RESULT | ACQUISITION DATE AND TIME |
|---|---|---|---|---|
| B | BASIC DATA HEALTH EXAMINATION DATA MEDICAL HISTORY DATA | FUJI HOSPITAL | NG: MEDICAL HISTORY DATA | ... |
| ... | ... | ... | ... | ... |
| X | BASIC DATA VITAL SIGN DATA | KAWASAKI SPORT CLUB | NG: VITAL SIGN DATA | ... |

| USER ID | DATA TYPE | DATA PROVISION DESTINATION | APPROVAL ACQUISITION RESULT | ACQUISITION DATE AND TIME |
|---|---|---|---|---|
| A | BASIC DATA<br>HEALTH EXAMINATION DATA<br>MEDICAL HISTORY DATA | FUJI HOSPITAL | ALLOW ALL | ... |
| B | BASIC DATA<br>HEALTH EXAMINATION DATA<br>MEDICAL HISTORY DATA | FUJI HOSPITAL | NG: MEDICAL HISTORY DATA | ... |
| .. | .. | .. | .. | .. |
| X | BASIC DATA<br>VITAL SIGN DATA | KAWASAKI SPORT CLUB | NG: VITAL SIGN DATA | ... |

| USER ID | DATA TYPE | DATA PROVISION DESTINATION | APPROVAL ACQUISITION RESULT | ACQUISITION DATE AND TIME |
|---|---|---|---|---|
| A | BASIC DATA<br>HEALTH EXAMINATION DATA<br>MEDICAL HISTORY DATA | FUJI HOSPITAL | NG: MEDICAL HISTORY DATA | ... |
| B | BASIC DATA<br>HEALTH EXAMINATION DATA<br>MEDICAL HISTORY DATA | FUJI HOSPITAL | NG: HEALTH EXAMINATION DATA<br>NG: MEDICAL HISTORY DATA | ... |
| .. | .. | .. | .. | .. |
| X | BASIC DATA<br>VITAL SIGN DATA | KAWASAKI SPORT CLUB | OK | ... |

FIG. 10A

| MEDICAL HISTORY DATA ||||
|---|---|---|---|
| USER ID | MEDICAL HISTORY | PROVISION | DATA REGISTRATION DATE AND TIME |
| A | HIGH BLOOD PRESSURE | - | 2017.10.31 10:22 |
| B | HIGH BLOOD PRESSURE | NG | ... |
|   | COLORECTAL CANCER | NG |   |
| : | : | : | : |
| X | HIGH BLOOD PRESSURE | OK | ... |

| MEDICAL HISTORY DATA ||||
|---|---|---|---|
| USER ID | MEDICAL HISTORY | PROVISION | DATA REGISTRATION DATE AND TIME |
| A | DEPRESSION | - | 2018.4.30 10:20 |
|   | HIGH BLOOD PRESSURE | OK |   |
| B | DEPRESSION | NG | ... |
|   | STOMACH CANCER | NG |   |
| : | : | : | : |
| X | HIGH BLOOD PRESSURE | OK | ... |

T1

INFORMATION PROVISION APPARATUS AND INFORMATION PROVISION METHOD

CROSS-REFERENCE TO RELATED APPLICATION

This application is based upon and claims the benefit of priority of the prior Japanese Patent Application No. 2018-147830, filed on Aug. 6, 2018, the entire contents of which are incorporated herein by reference.

FIELD

The embodiments discussed herein are related to an information provision technology.

BACKGROUND

A known scheme is used for providing personal data for web services. As another known scheme, a personal data store (PDS) is developed in which an individual (hereinafter referred to as a user) accumulates and manages their own data (for example, personal data) under their control. In addition, as a system implemented by using the PDS, an information bank is developed. The PDS and the information bank (hereinafter simply referred to as the PDS) evaluate the appropriateness on behalf of a user in accordance with the user's instruction or a predetermined condition and accordingly provide data to third parties. The related art is disclosed in, for example, Japanese Laid-open Patent Publication No. 2017-151942.

SUMMARY

According to an aspect of the embodiments, an information provision apparatus includes a memory configured to store personal data for each user, and a processor coupled to the memory and configured to in response to receiving a request for first personal data of a first user from a terminal device, determine difference between first data stored in the memory as the first personal data at a first time of receiving the request and second data stored in the memory as the first personal data at a second time before the first time, provision of the second data being permitted, perform, in accordance with the difference, determination of whether provision of the first data is permitted, and when it is determined that the provision of the first data is permitted, transmit the first data to the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of an approval information storage unit;

FIG. 9A illustrates an example of a management table used for managing approval information; FIG. 9B illustrates another example of the management table used for managing the approval information;

FIG. 10A illustrates an example of a management table used for managing medical history data; FIG. 10B illustrates another example of the management table used for managing the medical history data;

DESCRIPTION OF EMBODIMENTS

For example, a user deposits data of personally identifiable information that the user presents to a health center when having a health examination and information about the result of the health examination. When the PDS provides the data for a third party, such as a hospital, since it is desired to securely provide the data for the third party, the data is provided after the user's approval is obtained. In this manner, the third party is able to use the information provided by the PDS.

In the related art, it is preferable that the PDS obtain approval from the user whenever data is provided for a third party. This, however, results in a problem in which the user does laborious operation to repeatedly grant approvals.

Figure 1:
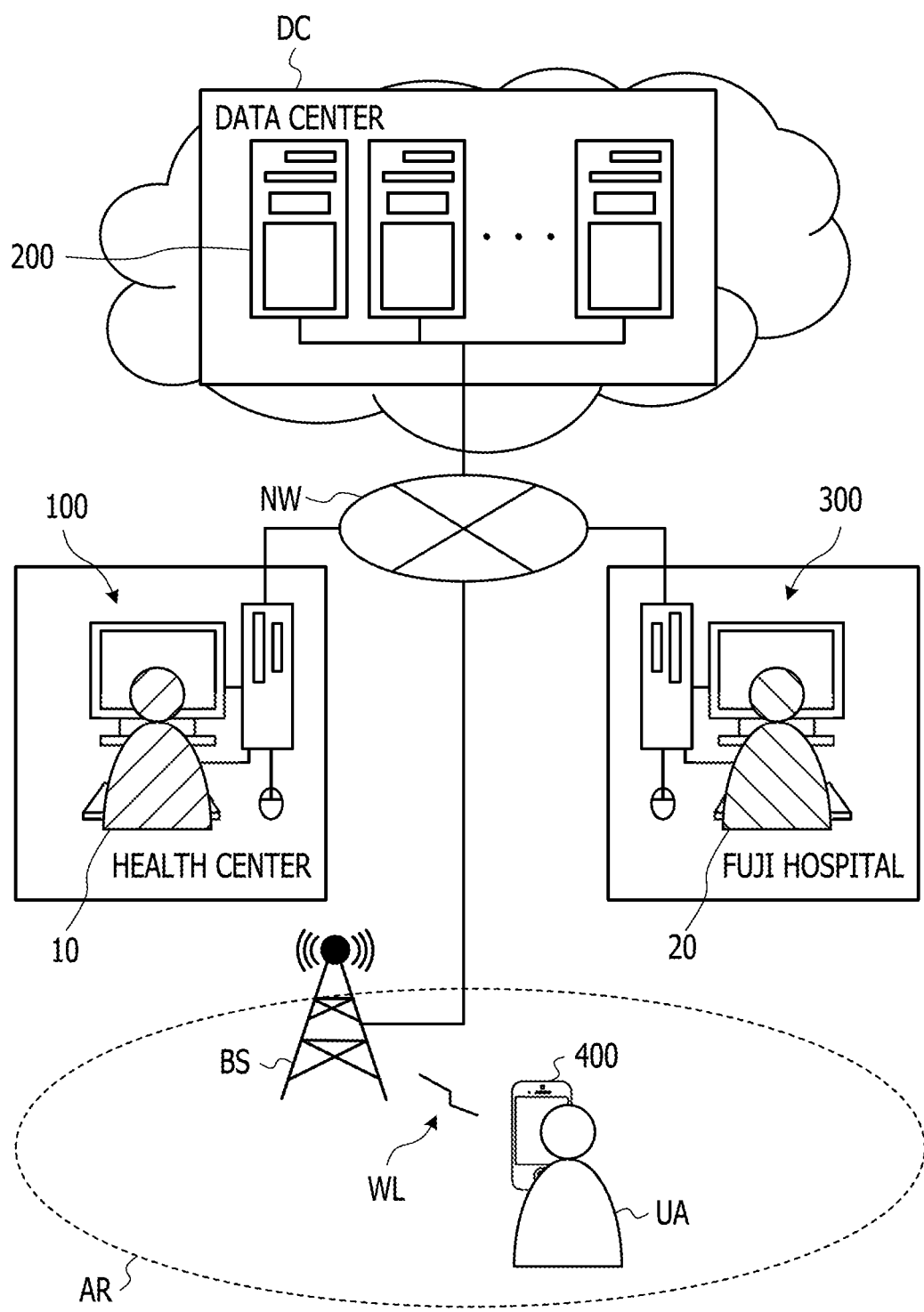
FIG. 1 illustrates an example of an information provision system according to a first embodiment.

FIG. 1 illustrates an example of an information provision system ST according to a first embodiment. The information provision system ST according to the first embodiment includes a center terminal 100, a PDS server 200, a medical terminal 300, and a user terminal 400. The PDS server 200 is an example of an information provision apparatus. The center terminal 100, the PDS server 200, and the medical terminal 300 are connected to each other via a communication network NW. The Internet is an example of the communication network NW.

A base station BS is connected to the communication network NW. When the user terminal 400 is located within an area AR of the base station BS in which network communication is available, the user terminal 400 is able to be connected to the communication network NW by using wireless communication WL. As the wireless communication WL, for example, Long Term Evolution (LTE) is utilized. As described above, the center terminal 100, the medical terminal 300, and the user terminal 400 are all able to access the PDS server 200.

The center terminal 100 is installed at an establishment that provides personal data for the PDS server 200. In the first embodiment, as illustrated in FIG. 1, the center terminal 100 is installed at a health center in which health examination is conducted. A personal computer (PC) is an example of the center terminal 100. For example, after a health examination for a user UA is finished in the health center, a health examination staff 10 inputs various kinds of personal data relating to the user UA to the center terminal 100. The personal data used in the first embodiment includes basic data containing various kinds of personally identifiable information, such as name and address of the user UA, health examination data containing information of the results of health examination, such as height and weight, medical history data containing information about medical history including information about diseases and medical signs the user UA has had, and vital sign data containing blood pressure, pulse, and the like. When the personal data is input to the center terminal 100, the center terminal 100 registers the input personal data in the PDS server 200. Alternatively, the center terminal 100 may transmit the personal data to the user terminal 400 and then the user terminal 400 may register the personal data in the PDS server 200.

The PDS server 200 is a server device in which a PDS is deployed. The PDS server 200 is installed at a data center DC that provides a cloud service. The PDS server 200 accumulates and manages personal data registered by the center terminal 100. As will be described in detail later, the PDS server 200 receives from the medical terminal 300 a request for obtaining personal data. When receiving the request for obtaining data, the PDS server 200 performs various processes and determines whether it is enabled to provide personal data managed by the PDS server 200 for a third party other than the owner (for example, the user UA) to which the personal data belongs without obtaining approval from the owner. When the PDS server 200 determines that it is enabled to provide the personal data for the third party without obtaining approval from the owner, the PDS server 200 provides the personal data for the third party without obtaining approval from the owner.

The medical terminal 300 is installed at a hospital or a clinic in which personal data is utilized. In the first embodiment, as illustrated in FIG. 1, the medical terminal 300 is installed at Fuji Hospital. A PC is an example of the medical terminal 300. For example, in the case in which the user UA is due to consult a doctor 20 at Fuji Hospital a few days after having a health examination, the doctor 20 obtains personal data of the user UA in advance. Specifically, the doctor 20 operates the medical terminal 300 and attempts to obtain the personal data of the user UA managed by the PDS server 200. The medical terminal 300 transmits a request for obtaining data described above to the PDS server 200 in accordance with the operation performed by the doctor 20. The PDS server 200 provides part or all of the personal data of the user UA or declines to provide the personal data depending on the status of approval of the user UA or the status of approval of other users other than the user UA. In this manner, the doctor 20, who is a third party with respect to the user UA, is able to obtain and use personal data in accordance with the status of approval of the user UA.

The user terminal 400 is a terminal device used by the user UA. A smartphone and a tablet terminal are examples of the user terminal 400. A PC may be used as the user terminal 400. When the user terminal 400 is requested by the PDS server 200 to grant approval for providing personal data, the user terminal 400 displays a data provision approval confirmation screen. The user UA selects, on the data provision approval confirmation screen, allow or don't allow for approval for providing data with respect to individual data types of personal data. The PDS server 200 determines whether to provide the personal data of the user UA for the destination in accordance with the status of approval for providing data selected via the user terminal 400.

Figure 2:
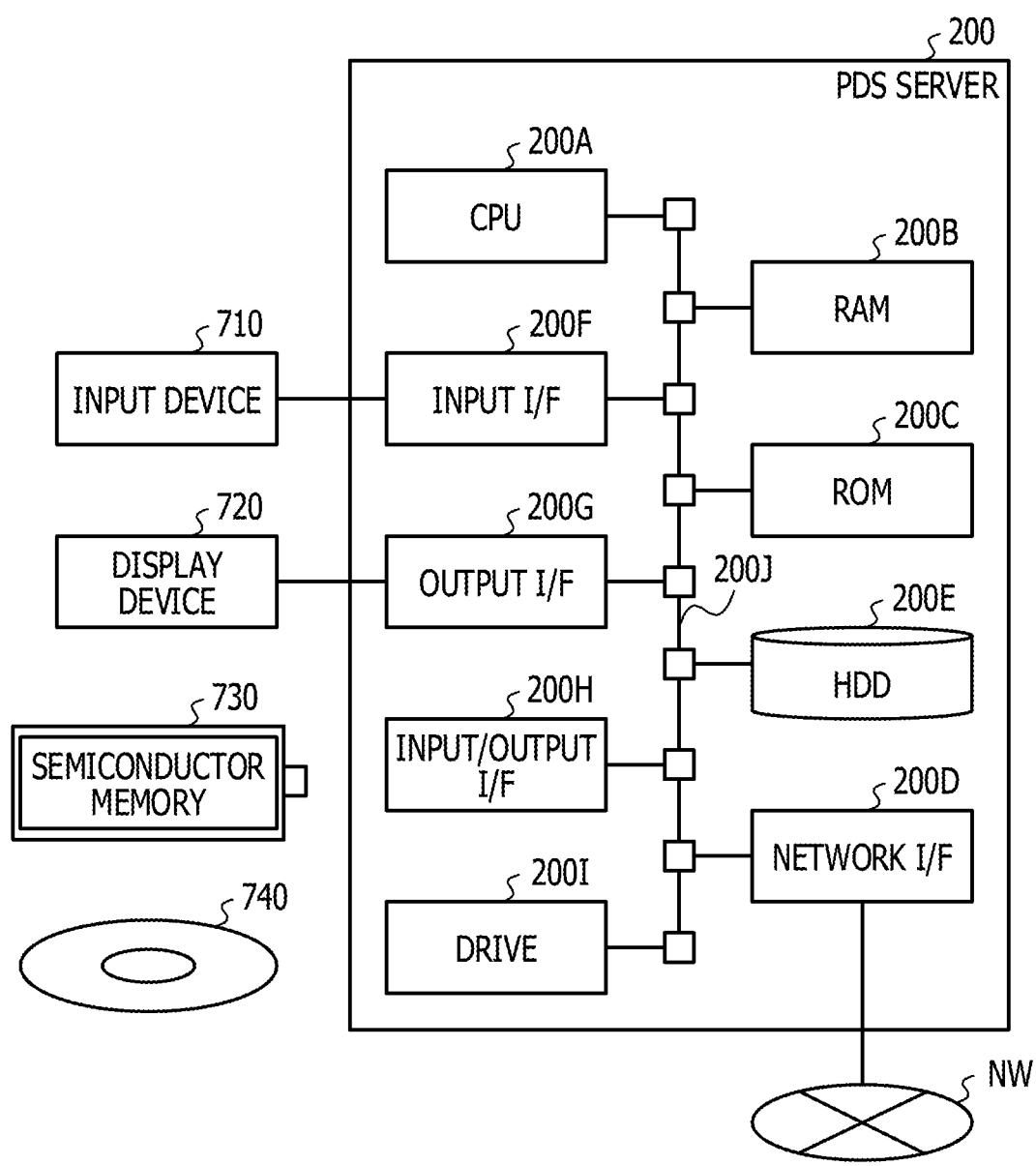
FIG. 2 illustrates an example of a hardware configuration of a PDS server.

FIG. 2 illustrates an example of a hardware configuration of the PDS server 200. It is noted that the center terminal 100, the medical terminal 300, and the user terminal 400 described above have the same main hardware configuration as that of the PDS server 200 and the description thereof is thus omitted. As illustrated in FIG. 2, the PDS server 200 includes at least a central processing unit (CPU) 200A serving as a hardware processor, a random access memory (RAM) 200B, a read only memory (ROM) 200C, and a network interface (I/F) 200D. The PDS server 200 may include any one or any combination of a hard disk drive (HDD) 200E, an input I/F 200F, an output I/F 200G, an input/output I/F 200H, and a drive 200I as desired. The components, that is, the CPU 200A to the drive 200I, are coupled to each other via an internal bus 200J. That is to say, the PDS server 200 may be implemented as a computer. It is noted that a micro processing unit (MPU) may be used as a hardware processor instead of the CPU 200A.

The input I/F 200F is capable of being coupled to an input device 710. A keyboard and a mouse are examples of the input device 710. The output I/F 200G is capable of being coupled to a display device 720. A liquid crystal display is an example of the display device 720. The input/output I/F 200H is capable of being coupled to a semiconductor memory 730. A Universal Serial Bus (USB) memory and a flash memory are examples of the semiconductor memory 730. The input/output I/F 200H reads a program and data stored in the semiconductor memory 730. The input I/F 200F and the input/output I/F 200H have, for example, USB ports. The output I/F 200G has, for example, a display port.

The drive 200I is capable of being coupled to a portable storage medium 740 such that the portable storage medium 740 is inserted into the drive 200I. A removable disk, such as a compact disc (CD)-ROM or a digital versatile disc (DVD), is an example of the portable storage medium 740. The drive 200I reads a program and data recorded in the portable storage medium 740. The network I/F 200D has, for example, a communication circuit and a local area network (LAN) port. The network I/F 200D is connected to the communication network NW described above.

The CPU 200A causes a program recorded in the ROM 200C or the HDD 200E to be temporarily stored in the RAM 200B described above. The CPU 200A causes a program recorded in the portable storage medium 740 to be temporarily stored in the RAM 200B. The CPU 200A implements various functions described later and performs various processes by executing a plurality of instructions included in the program stored in the RAM 200B. The program may be configured to perform the process of a flowchart described later.

Figure 3:
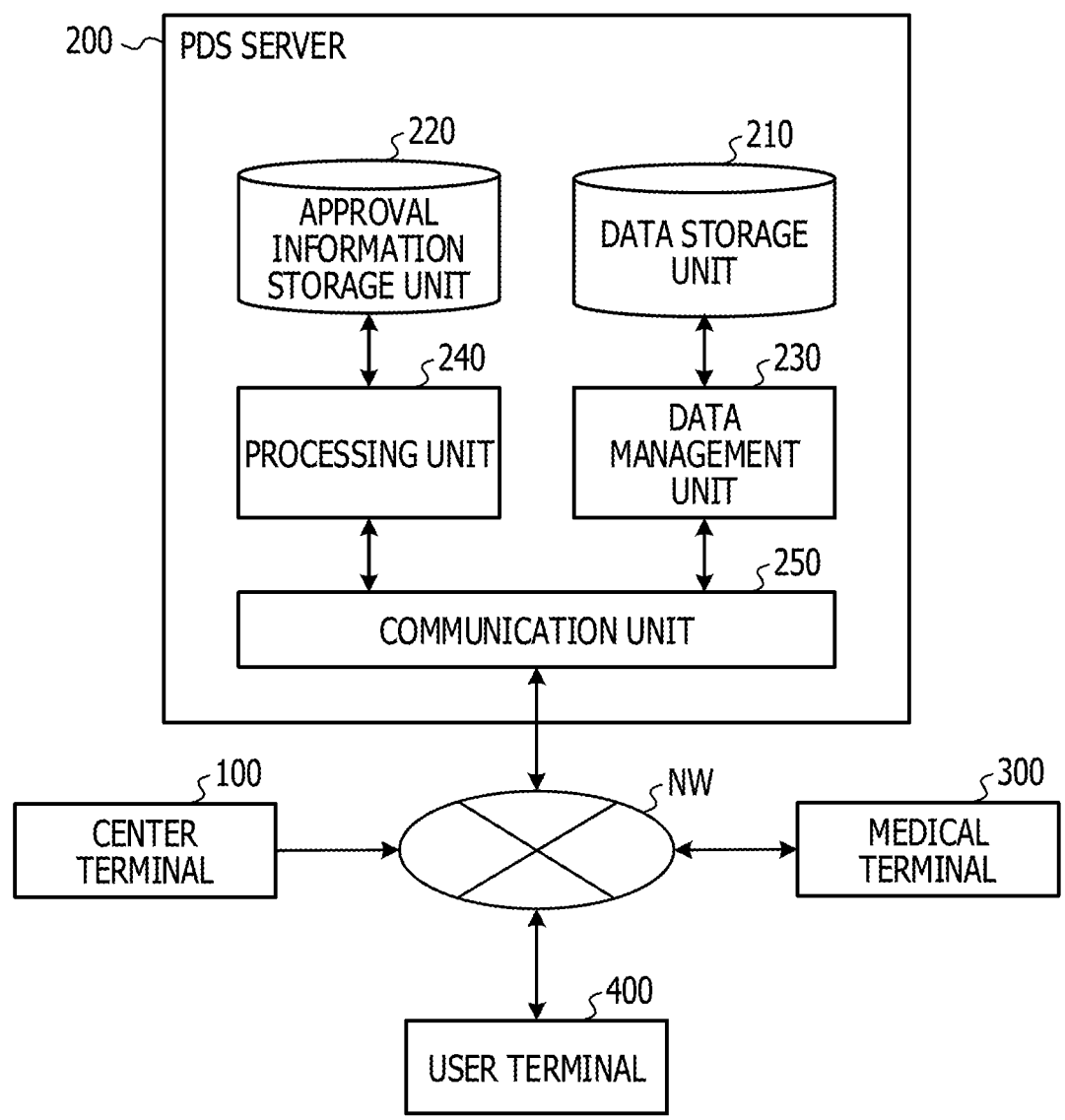
FIG. 3 is an example of a block diagram illustrating the PDS.
Figure 4:
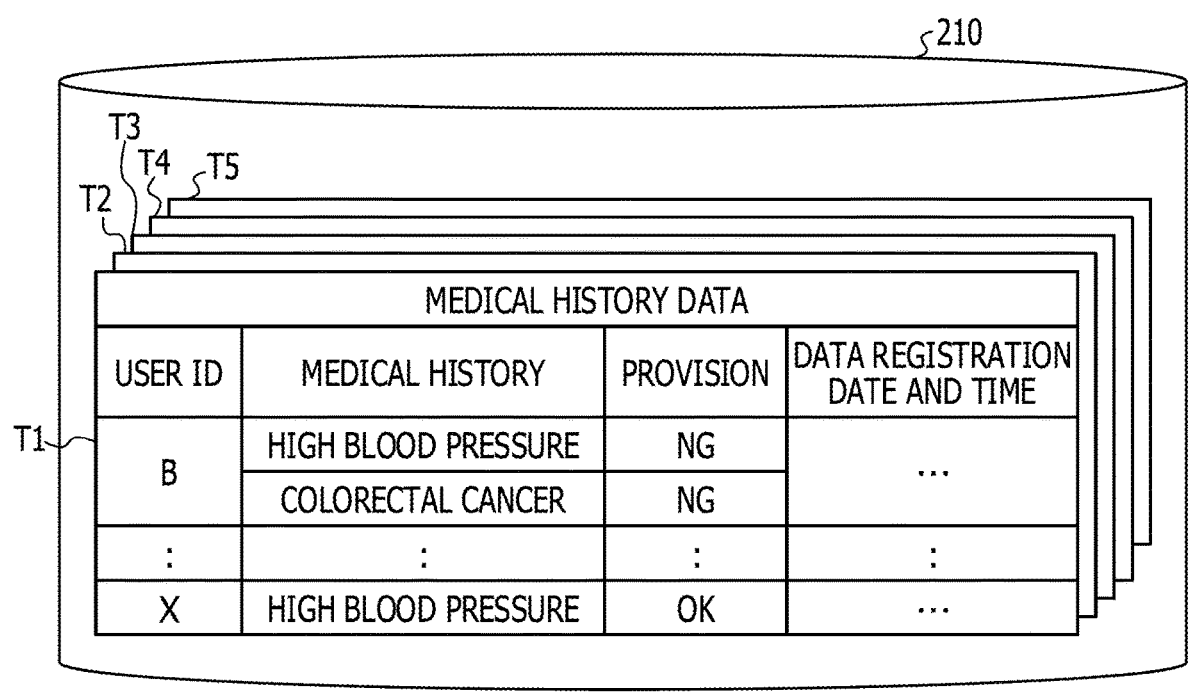
FIG. 4 illustrates an example of a data storage unit.

FIG. 3 is an example of a block diagram illustrating the PDS server 200. FIG. 4 illustrates an example of a data storage unit 210. FIG. 5 illustrates an example of an approval information storage unit 220. As illustrated in FIG. 3, the PDS server 200 includes the data storage unit 210, the approval information storage unit 220, a data management unit 230, a processing unit 240, and a communication unit 250. The data storage unit 210 and the approval information storage unit 220 may be implemented as, for example, the HDD 200E described above. The data management unit 230 and the processing unit 240 may be implemented as, for example, the CPU 200A described above. The communication unit 250 may be implemented as, for example, the network I/F 200D described above.

The data storage unit 210 stores personal data registered via the center terminal 100. As illustrated in FIG. 4, the personal data is managed in a manner in which the personal data is separated into multiple management tables T1, T2, T3, T4, and T5 in accordance with data types. As illustrated in FIG. 4, the management table T1 is used for managing medical history data. Not illustrated in detail in the drawing, the management table T2 is used for managing basic data; the management table T3 is used for managing health examination data; the management table T4 is used for managing meal data including a menu; and the management table T5 is used for managing vital sign data The management table T1 contains a user ID field, a medical history field, a provision field, and a data registration date and time field. An identifier that is used for distinguishing multiple users including the user UA is registered in the user ID field. Since the user UA has no medical history, no medical history data associated with a user ID "A" is included in the management table T1. Medical history containing information about diseases and medical signs that a corresponding user has had is registered in the medical history field. For example, since a user identified by a user ID "B" has had high blood pressure and colorectal cancer, these are registered as medical history. In the provision field, a positive status (for example, allow) of approval for providing medical history or a negative status (for example, don't allow) of approval for providing medical history is registered with respect to each item of medical history. In the first embodiment, it is seen from the drawing that the user identified by the user ID "B" declines to provide personal data. The information indicating allow or don't allow is not registered at the time of registering personal data and later registered in accordance with a result of operation performed by the processing unit 240 or a result of operation performed on the user terminal 400. The date and time when personal data is registered is registered in the data registration date and time field.

The approval information storage unit 220 stores approval information. As will be described in detail later, the approval information is generated by the processing unit 240 in accordance with a result of operation performed on the user terminal 400. The approval information is managed by using a management table T6 as illustrated in FIG. 5. The management table T6 contains a user ID field, a data type field, a data provision destination field, an approval acquisition result field, and an acquisition date and time field. An identifier that is used for distinguishing multiple users including the user UA is registered in the user ID field. FIG. 5 illustrates the management table T6 in the state in which the approval of the user UA has not been obtained. Data types of personal data, such as basic data and medical history data, are registered in the data type field. A destination to which personal data is provided, such as Fuji Hospital or Kawasaki sports club in this embodiment, is registered in the data provision destination field. The result of acquisition of approval for providing personal data is registered in the approval acquisition result field with respect to each data type of personal data. For example, it is seen from the drawing that the user identified by the user ID "B" approves provision of basic data and health examination data but does not approve provision of medical history data. The date and time when approval is obtained is registered in the acquisition date and time field.

The data management unit 230 manages personal data stored in the data storage unit 210. Specifically, the data management unit 230 receives personal data via the communication unit 250, then classifies the received personal data into data types of personal data, and registers the classified items of personal data in the data storage unit 210 to manage. In this manner, the data storage unit 210 stores various data types of personal data (see FIG. 4). When the data management unit 230 receives via the communication unit 250 a request for providing personal data, the request being generated by the processing unit 240, the data management unit 230 obtains personal data from the data storage unit 210 and provides the personal data via the communication unit 250.

The processing unit 240 manages approval information stored in the approval information storage unit 220. In addition, when receiving via the communication unit 250 a request for obtaining data, the processing unit 240 requests, via the communication unit 250, approval for providing data. When the processing unit 240 receives a result of operation performed via the user terminal 400, the processing unit 240 generates approval information in accordance with the result of operation and various kinds of information contained in the request for obtaining data and registers the generated approval information in the approval information storage unit 220. In this manner, the approval information storage unit 220 stores the approval information (see FIG. 5). After the processing unit 240 registers the approval information, the processing unit 240 generates a request for providing personal data and outputs the request to the data management unit 230. The processing unit 240 also performs various other processes.

The communication unit 250 controls communication between the PDS server 200, and the center terminal 100, the medical terminal 300, and the user terminal 400. For example, the communication unit 250 receives personal data transmitted by the center terminal 100 and responsively outputs the received personal data to the data management unit 230. When receiving a request for obtaining data transmitted by the medical terminal 300, the communication unit 250 outputs the received request for obtaining data to the processing unit 240. When receiving a request for providing personal data output by the processing unit 240, the communication unit 250 outputs the received request for providing personal data to the data management unit 230. The communication unit 250 receives personal data output by the data management unit 230 and responsively transmits the received personal data to the medical terminal 300.

Figure 6:
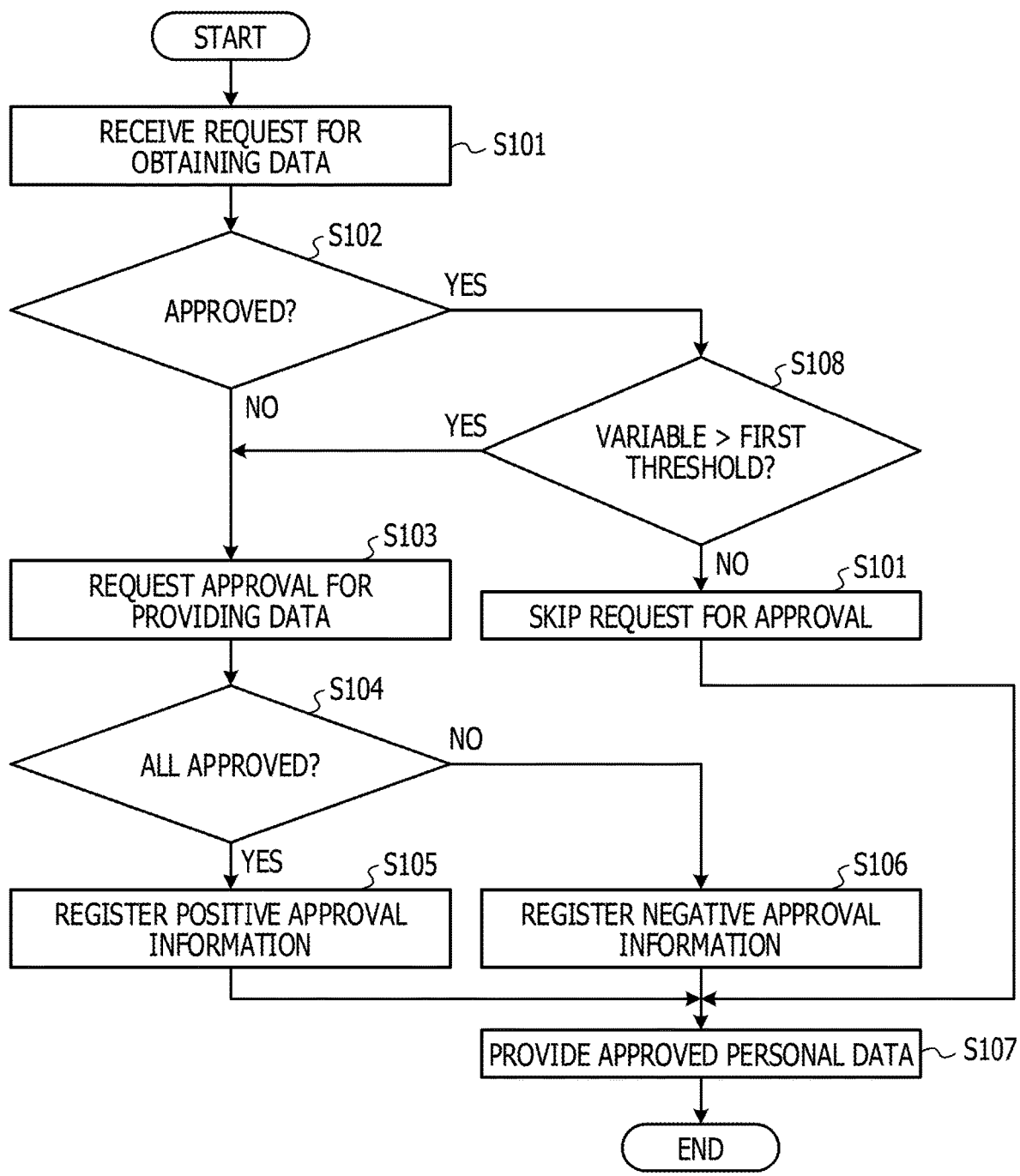
FIG. 6 is a flowchart illustrating an example of operation performed by the PDS server according to the first embodiment.
Figure 7:
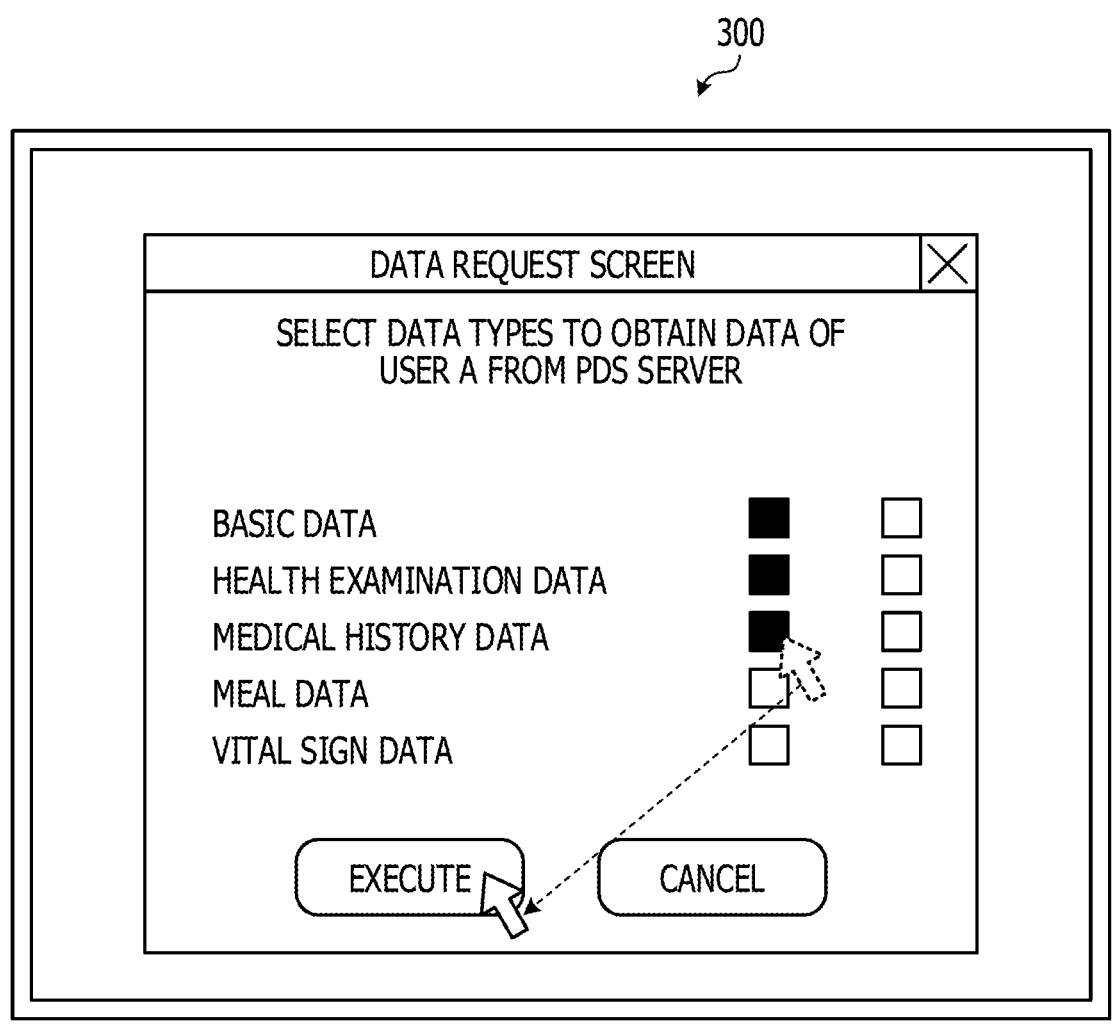
FIG. 7 illustrates an example of a data request screen displayed on a medical terminal.
Figure 8:
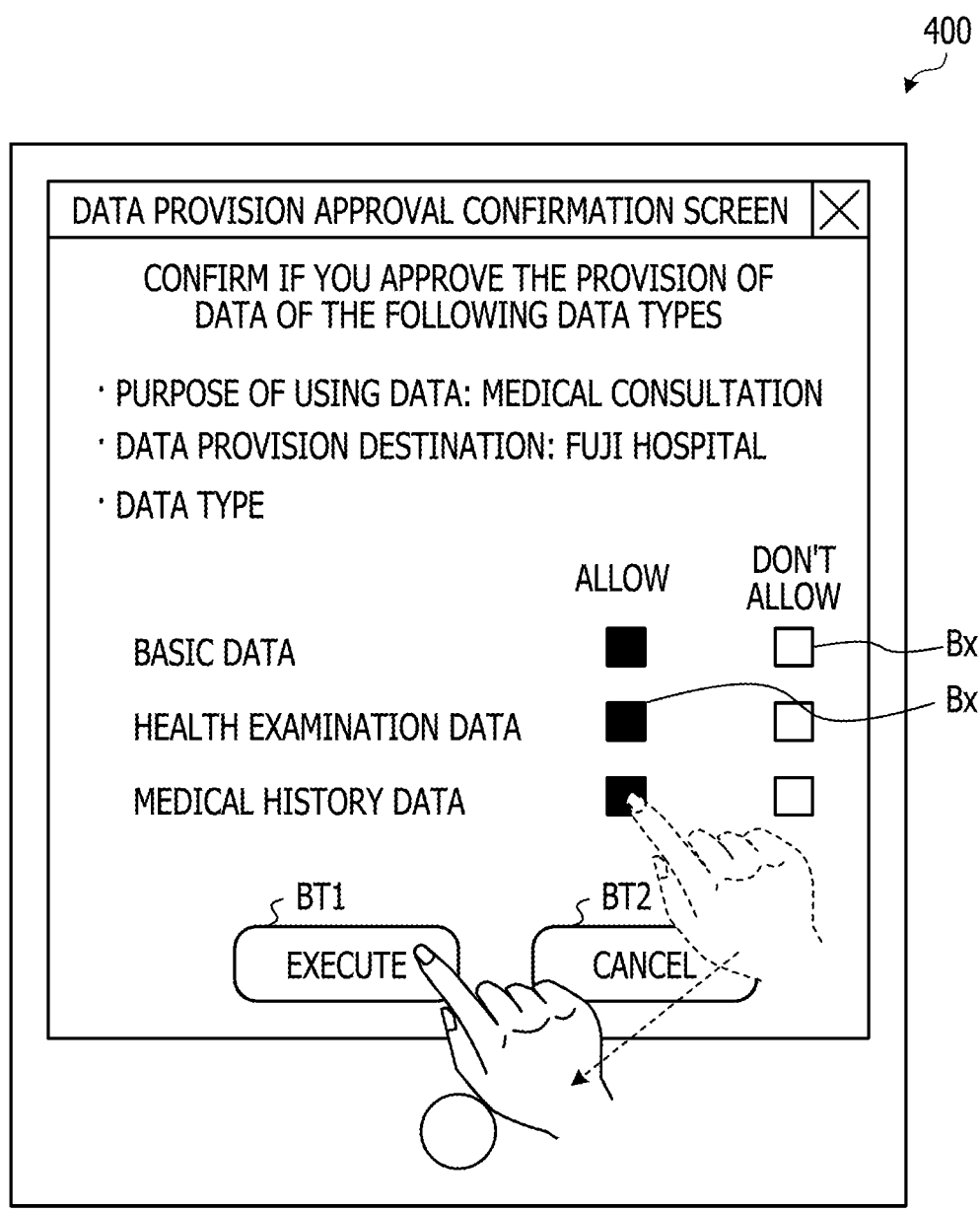
FIG. 8 illustrates an example of a data provision approval confirmation screen displayed on a user terminal.
Figure 11:
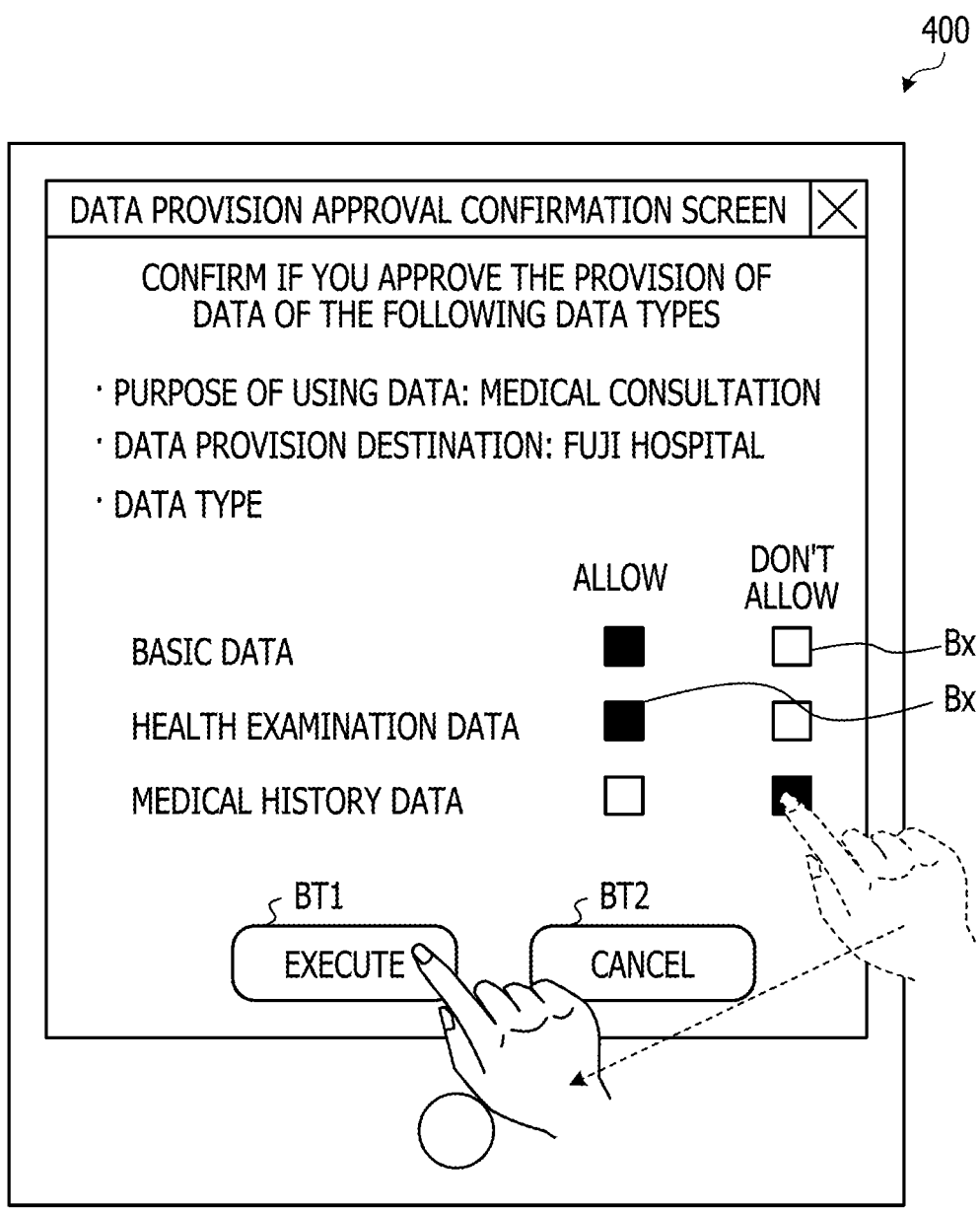
FIG. 11 illustrates another example of the data provision approval confirmation screen displayed on the user terminal.

FIG. 6 is a flowchart illustrating an example of operation performed by the PDS server 200 according to the first embodiment. FIG. 7 illustrates an example of a data request screen displayed on the medical terminal 300. FIG. 8 illustrates an example of the data provision approval confirmation screen displayed on the user terminal 400. FIG. 9A illustrates an example of the management table T6 used for managing the approval information. FIG. 9B illustrates another example of the management table T6 used for managing the approval information. FIG. 10A illustrates an example of the management table T1 used for managing medical history data. FIG. 1013 illustrates another example of the management table T1 used for managing medical history data. FIG. 11 illustrates another example of the data provision approval confirmation screen displayed on the user terminal 400.

Firstly, as illustrated in FIG. 6, the processing unit 240 receives a request for obtaining data (step S101). For example, when the doctor 20 performs an operation on the medical terminal 300 to request the user UA's personal data containing basic data, health examination data, and medical history data as illustrated in FIG. 7, the medical terminal 300 accordingly transmits to the PDS server 200 a request for obtaining personal data of the user UA and the processing unit 240 receives the request for obtaining data. As described above, a request for obtaining data contains information about the purpose of utilizing personal data (for example, utilizing personal data for consultation) and information about a destination for which personal data is provided (for example, Fuji Hospital).

After the process in step S101 is completed, the processing unit 240 refers to the approval information storage unit 220 and determines whether approval has been granted (step S102). Specifically, by checking whether the approval information storage unit 220 retains the approval information of the user UA, the processing unit 240 determines whether the user UA has granted approval and the personal data of the user UA has been accordingly provided for Fuji Hospital.

When the processing unit 240 determines, by referring to the approval information storage unit 220, that approval has not been granted (NO in step S102), the processing unit 240 requests approval for providing data (step S103). For example, when the user UA has a consultation at Fuji Hospital for the first time, the approval information storage unit 220 does not retain any approval information of the user UA (see FIG. 5), and hence, the processing unit 240 determines that approval has not been granted and requests approval for providing data. In this case, the processing unit 240 sends to the user terminal 400 an email containing link information (specifically, a hyperlink) for designating the PDS server 200 for connection.

When the user terminal 400 receives the email, the user UA performs an instruction operation by using the link information contained in the email (for example, tapping or clicking). In response to this, the user terminal 400 displays a login screen for logging in the PDS server 200. The user UA inputs, via the login screen, a credential (for example, personal identification information or biological information), and responsively, the user terminal 400 displays the data provision approval confirmation screen as illustrated in FIG. 8.

The data provision approval confirmation screen contains information about the purpose of utilizing personal data, the destination for which personal data is provided, and the data types of personal data, and operating buttons BT1 and BT2. To be specific, the data types includes the names of the data types and multiple selection boxes Bx used for selecting allow or don't allow for approval for providing personal data with respect to each data type. The user UA selects corresponding boxes of the selection boxes Bx associated with the data types of which the user UA grants approval for providing personal data and then presses the operating button BT1. In FIG. 8, the user UA grants approval for all the data types to provide corresponding personal data.

When the processing unit 240 detects that the operating button BT1 is pressed on the user terminal 400, the processing unit 240 determines whether approval is granted to provide all personal data (step S104) as illustrated in FIG. 6. Since the user UA has granted approval to provide personal data corresponding to all the data types as described above, the processing unit 240 determines that approval is granted to provide all personal data (YES in step S104). In this case, the processing unit 240 generates positive approval information indicating that provision of all the data types of personal data is approved and registers the positive approval information in the approval information storage unit 220 (step S105). Accordingly, as illustrated in FIG. 9A, the management table T6 retains the user ID "A" of the user UA, the data types contained in the request for obtaining data, the information indicating that provision of all the data types of personal data is approved, and the approval information including the date and time when the approval has been obtained.

By contrast, when the user UA has not granted approval to provide personal data corresponding to all the data types, the processing unit 240 determines that approval is not granted to provide all personal data (NO in step S104). In this case, the processing unit 240 generates negative approval information indicating that provision of any one, any combination, or all of the data types of personal data is not approved and registers the negative approval information in the approval information storage unit 220 (step S106). For example, when the user of the user ID "B" declines to provide medical history data, the processing unit 240 generates negative approval information and registers the negative approval information in the approval information storage unit 220. Accordingly, as illustrated in FIG. 9A, the management table T6 retains the user ID "B", the data types contained in the request for obtaining data, the information indicating that provision of any one, any combination, or all of the data types of personal data is not approved, and the approval information including the date and time when the positive or negative approval information has been obtained.

After the process in step S105 or S106 is completed, as illustrated in FIG. 6, the data management unit 230 provides personal data of the approved data types via the communication unit 250 (step S107). Specifically, among multiple items of personal data corresponding to the data types contained in the request for obtaining data, the data management unit 230 provides particular items of personal data corresponding to particular data types that are granted approval. As a result, when the user UA has a consultation at Fuji Hospital for the first time, the medical terminal 300 is able to obtain all personal data of the user UA corresponding to the request for obtaining data and the doctor 20 who operates the medical terminal 300 is able to have a consultation with the user UA after referring to the personal data of the user UA.

Next, a case in which the user UA has a health examination in half a year after the user UA had a first consultation at Fuji Hospital and then has a consultation again at Fuji Hospital is described. When the user UA had a consultation at Fuji Hospital, as described with reference to FIG. 4, since the user UA had no medical history, the user UA granted approval to provide all personal data. However, when it is discovered that the user UA has high blood pressure as the result of conducting health examination, medical history data is registered via the center terminal 100 or the user terminal 400, and as illustrated in FIG. 10A, the management table T1 contains medical history data of the user UA including the medical history information of high blood pressure to manage.

Here, when the doctor 20 performs again an operation on the medical terminal 300 to request the user UA's personal data containing basic data, health examination data, and medical history data as described above with reference to FIG. 7, the medical terminal 300 transmits to the PDS server 200 a request for obtaining personal data of the user UA. As a result, the processing unit 240 receives the request for obtaining data as in the process in step S101 illustrated in FIG. 6.

After the process in step S101 is completed, the processing unit 240 refers to the approval information storage unit 220 and determines again whether approval is granted in step S102. When the user UA has a consultation again, the approval information storage unit 220 retains the approval information of the user UA (see FIG. 9A). Since the user UA has granted approval in the past and the personal data of the user UA has been provided for Fuji Hospital, the processing unit 240 determines that approval is granted (YES in step S102). In this case, the processing unit 240 subsequently determines whether a variable is greater than a first threshold (step S108).

Specifically, firstly, the processing unit 240 specifies change in personal data of the user UA in response to the request for obtaining data. More specifically, the processing unit 240 has obtained from the data management unit 230 the personal data of the user UA at the previous time when the request for obtaining data was received and has retained the personal data as past personal data. At the time when the request for obtaining data is received again, the processing unit 240 obtains from the data management unit 230 the personal data of the user UA at the present time and retains the personal data as present personal data. The processing unit 240 compares the amount of information of the past personal data and the amount of information of the present personal data with respect to each data type and determines whether there is difference in the amount of information with respect to each data type. When the processing unit 240 determines that there is difference in the amount of information with respect to a particular data type, the processing unit 240 specifies change in the personal data corresponding to the particular data type. In the example in the first embodiment, as the result of comparing FIGS. 4 and 10A, the processing unit 240 specifies high blood pressure as the change in the personal data.

Subsequently, the processing unit 240 calculates the variable and determines whether the calculated variable is greater than the first threshold. Specifically, when the processing unit 240 specifies change, the processing unit 240 checks the status of approval for providing data with respect to each of the records of the medical history data that correspond to other users except for the user UA and that each include information identical to the specified change. When high blood pressure is specified as change, the processing unit 240 checks the status of approval of, for example, the user of the user ID "B", whose record includes high blood pressure in the medical history field. For example, it is assumed that 1000 records of medical history data includes high blood pressure in the medical history field, among which in 723 records approval has been granted to provide medical history data including high blood pressure and in 277 records approval has not been granted to provide medical history data including high blood pressure. In this case, approximately 72% of users other than the user UA have granted approval for providing medical history data including high blood pressure. Conversely, approximately 28% of users other than the user UA have not granted approval for providing medical history data including high blood pressure. The processing unit 240 calculates, as the variable, a ratio of records in which approval for providing data is not granted and determines whether the variable is greater than the first threshold (for example, 30%). Although a user has granted approval for providing their personal data at first, after the medical history is updated by adding illnesses, the user may decline to provide medical history depending on the content of the medical history and approval for providing personal data is accordingly changed to refusal. The processing unit 240 quantitatively determines such an alternation and accordingly changes processing.

When the processing unit 240 determines that the variable is equal to or less than the first threshold (NO in step S108), the processing unit 240 skips the request for approval (step S109). Specifically, when the variable is approximately 28% and the first threshold is determined to be 30% as described above, the processing unit 240 determines that the variable is less than the first threshold. Thus, when the focused medical history is high blood pressure, approximately 72% of users other than the user UA have granted approval for providing medical history data, and hence, it is assumed that skipping the request for approval less likely causes problems. Hence, in such a case, the processing unit 240 skips a request for approval.

After the process in step S109 is completed, the data management unit 230 performs the process in step S107. Specifically, the data management unit 230 determines that it is assumed the user UA could grant approval for providing medical history data and accordingly provides the medical terminal 300 with the medical history data together with basic data and health examination data as approved personal data. As described above, since personal data is provided for the medical terminal 300 without requesting approval of the user UA, the operation performed by the user UA for granting approval is reduced. It is noted that the data management unit 230 registers information indicating approval in the provision field of the record associated with the user UA in the medical history data before or after providing personal data.

Next, a case in which the user UA has a health examination in one year after the user UA had the first consultation at Fuji Hospital (in half a year after the user UA had the second consultation) and then has a third consultation at Fuji Hospital is described. When the user UA had the second consultation at Fuji Hospital, as described with reference to FIG. 10A, the user UA had medical history and the processing unit 240 determined that it was assumed the user UA could have granted approval for providing the medical history data because many users other than the user UA had approved provision of medical history including information identical to that of the user UA as described above. When it is discovered that the user UA has depression in addition to high blood pressure as the result of conducting health examination, medical history data is registered via the center terminal 100 or the user terminal 400, and as illustrated in FIG. 10B, the management table T1 contains medical history data of the user UA including the medical history information of high blood pressure and depression to manage.

Here, when the doctor 20 performs, similarly to the previous time of having a consultation, an operation on the medical terminal 300 to request the user UA's personal data containing basic data, health examination data, and medical history data as described above with reference to FIG. 7, the medical terminal 300 transmits to the PDS server 200 a request for obtaining personal data of the user UA. As a result, the processing unit 240 receives the request for obtaining data as in the process in step S101 illustrated in FIG. 6.

After the process in step S101 is completed, the processing unit 240 refers to the approval information storage unit 220 and determines again whether approval is granted in step S102. When the user UA has the third consultation, the approval information storage unit 220 has retained the approval information of the user UA (see FIG. 9A). When the user UA has granted approval in the past or it was assumed that the user UA could have granted approval and accordingly personal data of the user UA has been provided for Fuji Hospital, the processing unit 240 determines in step S102 that approval is granted. In this case, the processing unit 240 determines in step S108 whether the variable is greater than a first threshold.

As described above, firstly, the processing unit 240 specifies change in personal data of the user UA in response to the request for obtaining data. In the example in the first embodiment, as the result of comparing FIGS. 10A and 10B, the processing unit 240 specifies depression as the change in the personal data. Subsequently, the processing unit 240 calculates the variable by using the specified change and determines whether the calculated degree of change is greater than the first threshold.

When depression is specified as change, the processing unit 240 checks the status of approval of, for example, the user of the user ID "B", whose record includes depression in the medical history field. For example, it is assumed that 153 records of medical history data include depression in the medical history field, among which in 43 records approval has been granted to provide medical history data including depression and in 110 records approval has not been granted to provide medical history data including depression. In this case, approximately 28% of users other than the user UA have granted approval for providing medical history data including depression. Conversely, approximately 72% of users other than the user UA have not granted approval for providing medical history data including depression.

When the processing unit 240 determines that the variable is greater than the first threshold (YES in step S108), the processing unit 240 performs the process in step S103. When the variable indicating that approval has not been granted is approximately 72% and the first threshold is determined to be 30% as described above, the processing unit 240 determines that the variable is greater than the first threshold. Thus, when the focused medical history is depression, approximately 72% of users other than the user UA have not granted approval for providing medical history data, and hence, it is assumed that skipping the request for approval is undesirable. Thus, in such a case, the processing unit 240 requests approval.

Accordingly, the processing unit 240 sends to the user terminal 400 an email containing link information (specifically, a hyperlink) for designating the PDS server 200 for connection and the user terminal 400 receives the email. The user UA performs an instruction operation by using the link information contained in the email and the user terminal 400 responsively displays the login screen for logging in the PDS server 200. The user UA inputs a credential via the login screen, and responsively, the user terminal 400 displays the data provision approval confirmation screen as illustrated in FIG. 11.

The user UA selects corresponding boxes of the selection boxes Bx associated with the data types of which the user UA grants approval for providing personal data and a corresponding box of the selection boxes Bx associated with the data type of which the user UA does not grant approval for providing personal data and then presses the operating button BT1. In FIG. 11, the user UA does not grant approval for providing personal data of one (specifically, medical history data) of the data types. Conversely, the user UA grants approval for providing personal data of the rest (specifically, basic data and health examination data) of the data types.

When the processing unit 240 detects that the operating button BT1 is pressed in the user terminal 400, the processing unit 240 determines in step S104 whether approval is granted to provide all personal data. Since the user UA has not granted approval to provide personal data corresponding to any one or any combination of the data types as described above, the processing unit 240 determines that approval is not granted to provide all personal data. In this case, in step S106, the processing unit 240 generates negative approval information and registers the negative approval information in the approval information storage unit 220. For example, when the user of the user ID "A" declines to provide medical history data, the processing unit 240 generates negative approval information and registers the negative approval information in the approval information storage unit 220. Accordingly, as illustrated in FIG. 9B, the management table T6 retains the user ID "A", the data types contained in the request for obtaining data, the information indicating that provision of one (specifically, medical history data) of the data types of personal data has not been approved, and the approval information including the date and time when the approval information has been obtained.

As described above, according to the first embodiment, the PDS server 200 includes the data storage unit 210 and the processing unit 240. The data storage unit 210 stores the personal data of the user UA having been provided for the hospital as a third party other than the user UA at the first consultation with obtaining approval of the user UA. When providing the personal data of the user UA for the same hospital at the time of a subsequent consultation after the first consultation, the processing unit 240 compares the amount of information of the personal data at the time of the first consultation and the amount of information of the personal data at the time of the subsequent consultation; and when the amount of information differs between the first consultation and the subsequent consultation, the processing unit 240 determines, in accordance with the variable related to the change in the information, whether to require approval of the user UA. This reduces approval operation performed by the user UA.

Figure 12:
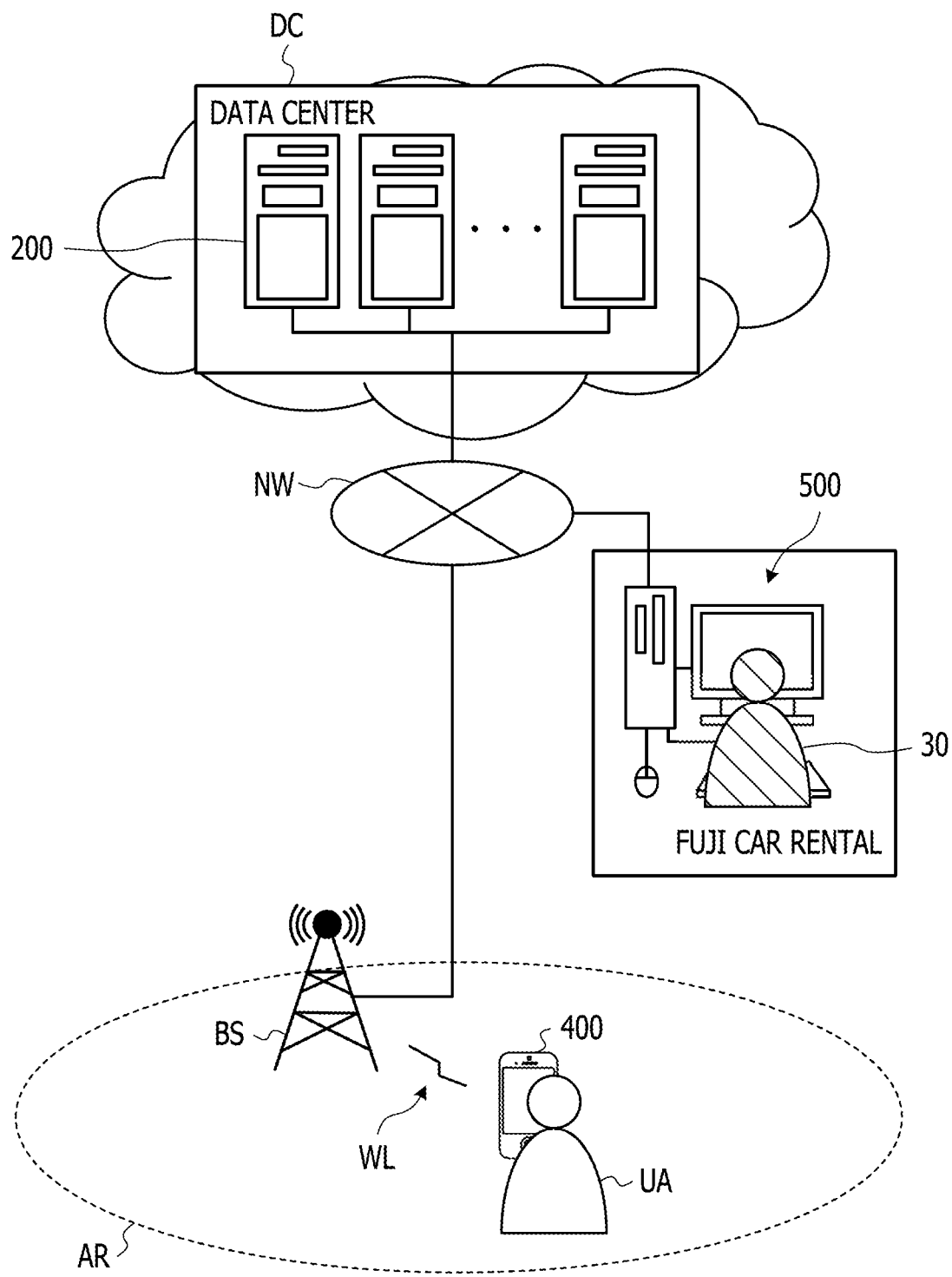
FIG. 12 illustrates an example of an information provision system according to a second embodiment.

Next, a second embodiment is described with reference to FIGS. 12 to 14. FIG. 12 illustrates an example of an information provision system ST according to the second embodiment. As illustrated in FIG. 12, unlike the information provision system ST according to the first embodiment, the information provision system ST according to the second embodiment does not include the center terminal 100. Alternatively, unlike the information provision system ST according to the first embodiment, the information provision system ST according to the second embodiment includes a business operator terminal 500 instead of the medical terminal 300. The business operator terminal 500 is installed at, for example, a business establishment in which personal data is utilized. In the second embodiment, as illustrated in FIG. 12, the business operator terminal 500 is installed at Fuji Car Rental. A PC or the like is used as the business operator terminal 500 similarly to the medical terminal 300.

When the user UA plans to rent a car, the user UA inputs in advance various kinds of personal data to the user terminal 400. The personal data used in the second embodiment includes basic data containing various kinds of personally identifiable information, such as name and address of the user UA and license data containing a driver's license number. When the personal data is input to the user terminal 400, the user terminal 400 registers the input personal data in the PDS server 200.

Meanwhile, a staff 30 of Fuji Car Rental obtains the personal data of the user UA in advance for the purpose of reducing the lending operation and time on the day when a car is lent to the user UA in the case of lending a car to the user UA for the first time. Specifically, the staff 30 operates the business operator terminal 500 and attempts to obtain the personal data of the user UA managed by the PDS server 200. The business operator terminal 500 transmits a request for obtaining data to the PDS server 200 in accordance with the operation performed by the staff 30. The PDS server 200 provides part or all of the personal data of the user UA or declines to provide the personal data depending on the status of approval of the user UA or the status of approval of other users other than the user UA. Particularly, when the user UA rents a car for the first time, the user terminal 400 displays the data provision approval confirmation screen in response to the operation performed by the user UA. When the user UA selects approval for providing their personal data, the processing unit 240 generates approval information and registers the approval information in the approval information storage unit 220, and as a result, the data management unit 230 provides the approved personal data for the business operator terminal 500. In this manner, the staff 30 is able to obtain and use personal data in accordance with the status of approval of the user UA.

Figure 13:
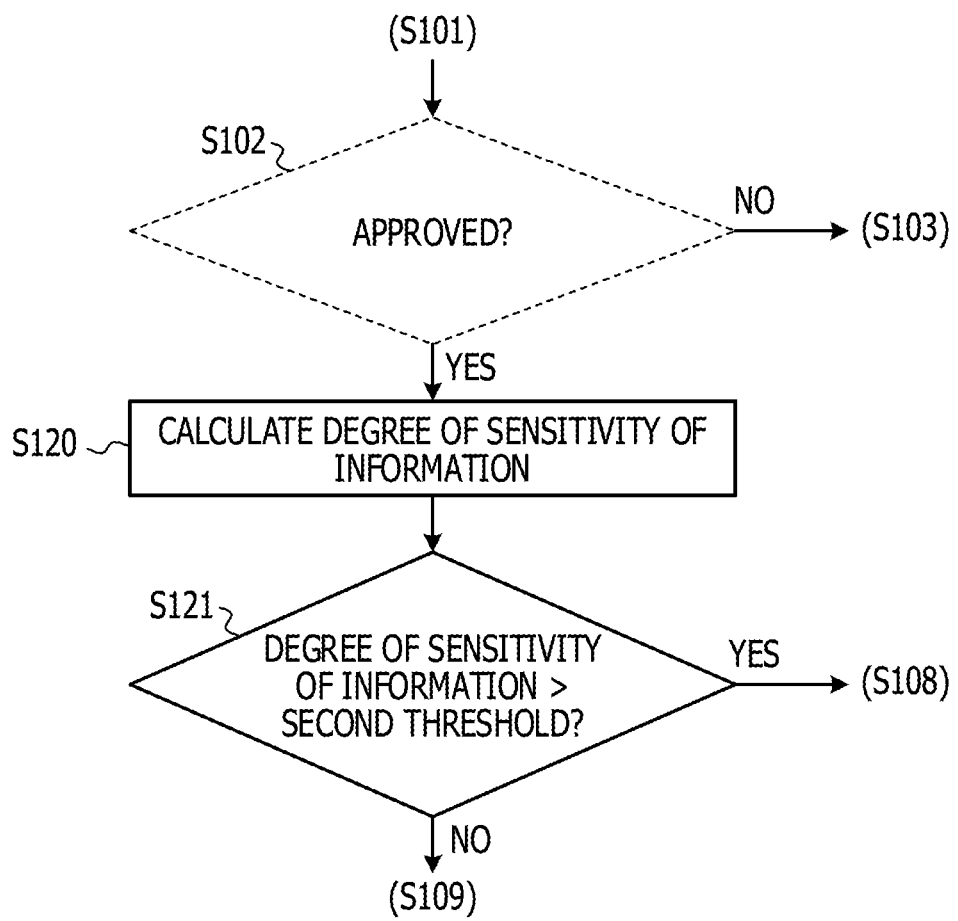
FIG. 13 is a flowchart partially illustrating operation performed by a PDS server according to the second embodiment.

Next, referring to FIG. 13, a case in which the user UA rents a car again at Fuji Car Rental at a time different from the first time the user UA rented a car at Fuji Car Rental is described. FIG. 13 is a flowchart partially illustrating operation performed by the PDS server 200 according to the second embodiment. FIG. 14 is an example of an EP map. The flowchart illustrated in FIG. 13 is added to the flowchart described with reference to FIG. 6. Specifically, when, in the process in step S102 described in the first embodiment, the processing unit 240 refers to the approval information storage unit 220 and determines that approval is granted, the processing unit 240 calculates the degree of sensitivity of information (step S120). After the process in step S120 is completed, the processing unit 240 determines whether the degree of sensitivity of information is greater than a second threshold (step S121). When the processing unit 240 determines that the degree of sensitivity of information is greater than the second threshold, the processing unit 240 performs the process in step S108 described in the first embodiment. In contrast, when the processing unit 240 determines that the degree of sensitivity of information is equal to or less than the second threshold, the processing unit 240 performs the process in step S109 described in the first embodiment.

Figure 14:
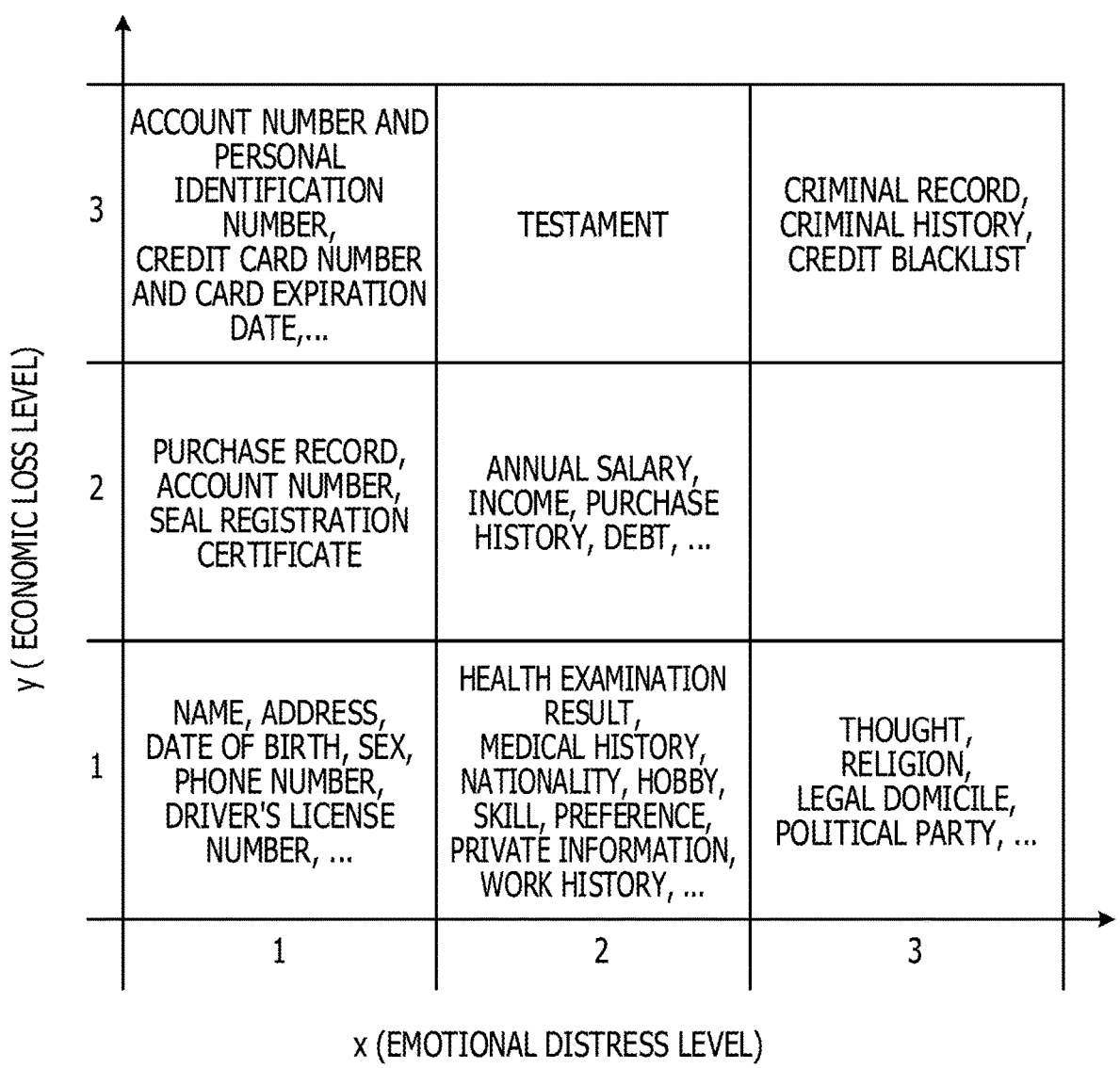
FIG. 14 is an example of an economic-privacy (EP) map.

The degree of sensitivity of information is calculated in accordance with the following equation (1):

$$\text{the degree of sensitivity of information} = (10^{x-1} + 5^{y-1}) \quad (1)$$

where a parameter x, which is associated with the horizontal axis of the EP map illustrated in FIG. 14, is the degree of emotional distress possibly caused for a victim if their personal data is leaked and a parameter y, which is associated with the vertical axis of the EP map, is the degree of economic loss possibly caused for the victim if their personal data is leaked.

The EP map contains not only personally identifiable information but also sensitive information as personal data. The sensitive information is different from personally identifiable information, such as name, address, sex, and date of birth, and contains, for example, personal information that may cause social discrimination, such as thought and ideology.

When the processing unit 240 receives again a request for obtaining data transmitted by the business operator terminal 500, since the approval information storage unit 220 retains the approval information containing information indicating that the user UA has approved provision of personal data for Fuji Car Rental, the processing unit 240 calculates the degree of sensitivity of information. Here, when it is assumed that basic data containing personally identifiable information, such as name and address, is leaked, the processing unit 240 refers to FIG. 14 and determines that (x, y)=(1, 1). Similarly, when it is assumed that license data containing a driver's license number is leaked, the processing unit 240 refers to FIG. 14 and determines that (x, y)=(1, 1). When multiple values are determined as the parameters x and y with respect to the two data items as in the examples described above, the processing unit 240 uses greatest values for the parameters x and y. In this example the parameters x and y are (1, 1) for each data item, the processing unit 240 uses (1, 1) as (x, y) that are substituted in equation (1). Accordingly, the processing unit 240 obtains 2 as the degree of sensitivity of information. As described above, the processing unit 240 is able to quantify sensitive information such that, as the adverse effect on the user UA possibly caused by leakage of sensitive information increases, the degree of sensitivity of information increases. For example, when the processing unit 240 determines (1, 1), (2, 1), and (1, 3) as the parameters x and y, the processing unit 240 uses (2, 3) as (x, y) that are substituted in equation (1), and as a result, obtains 35 as the degree of sensitivity of information.

Subsequently, the processing unit 240 determines whether the calculated degree of sensitivity of information is greater than the second threshold (for example, 10). When the processing unit 240 obtains 2 as the degree of sensitivity of information as described above, the processing unit 240 determines that the degree of sensitivity of information is less than the second threshold (NO in step S121). In this case, the processing unit 240 performs the process in step S109. When the degree of sensitivity of information is equal to or less than the second threshold, it is assumed that adverse effect on the victim possibly caused by leakage of personal data is relatively small, and thus, the processing unit 240 skips a request for approval of the user UA.

By contrast, when the processing unit 240 obtains 35 as the degree of sensitivity of information as described above, the processing unit 240 determines that the degree of sensitivity of information is greater than the second threshold (YES in step S121). In this case, the processing unit 240 performs the process in step S108. When the degree of sensitivity of information is greater than the second threshold, it is assumed that adverse effect on the victim possibly caused by leakage of personal data is relatively large, the processing unit 240 performs the process in step S103 or S109 depending on the result determined in step S108.

As described above, according to the second embodiment, it is possible to reduce approval operation performed by a user by using the degree of sensitivity of information in addition to the variable described in the first embodiment.

While the preferred embodiments of the present disclosure have been described above, the present disclosure is not limited to the particular embodiments and various modifications and changes may be made within the scope of the present disclosure described in claims. For example, while the first and second embodiments describe cases using basic data and the like, the present disclosure may be applied to management of purchase data including purchase history. In the case of purchase data, a sales staff at a shopping mall, for example, requests obtaining purchase data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information provision apparatus comprising:
a memory configured to store, for each user of a plurality of users, personal data obtained in a plurality of time points, the personal data obtained in at least any one of the plurality of time points being associated with approval information indicating a positive status or a negative status of approval for providing the personal data, the personal data including a plurality of items with respect to that user; and
a processor coupled to the memory and the processor configured to:
in response to receiving a request for the personal data of a first user from a terminal device, obtain a determination result by determining, for each of the plurality of items, whether there is difference between first personal data and second personal data, the first personal data being the personal data of the first user stored in the memory at a first time point, the second personal data being the personal data of the first user stored in the memory at a second time point before the first time point, the second personal data being associated with the approval information indicating the positive status of approval for providing the second personal data of the first user, the first personal data having been not yet associated with the approval information indicating the positive status of approval for providing the first personal data of the first user;
in response to the determination result indicating that the difference between the first personal data and the second personal data exists in one or more items from among the plurality of items, obtain, for a respective item of the one or more items, a first group of the personal data from among the personal data stored in the memory in association with the plurality of users other than the first user, the first group of the personal data as to the plurality of users other than the first user being plural pieces of the personal data each of which has the respective item same as the first personal data of the first user;
in response to the obtaining of the first group, calculate, for each of the one or more items, a ratio that is a proportion of a second group relative to the first group by dividing an amount of the second group by an amount of the first group, the second group being plural pieces of the personal data in the first group which has been associated with the approval information indicating the negative status of approval;
in a case where for all of the one or more items, the calculated ratio is less than a predetermined threshold, transmit the first personal data to the terminal device; and
in a case where for any of the one or more items, the calculated ratio is not less than the predetermined threshold, transmit to the first user a request to request approval for providing the first personal data.

2. The information provision apparatus according to claim 1, wherein,
the determination includes determining that the providing of the first personal data is permitted when the difference is not more than a first threshold.

3. The information provision apparatus according to claim 2, wherein
the determination includes determining that the providing of the first personal data is not permitted when the difference is more than the first threshold, and
the processor is further configured to, when it is determined that the providing of the first personal data is not permitted, transmit, to the first user, another request for confirming approval for the providing of the first personal data.

4. The information provision apparatus according to claim 1, wherein
the processor is further configured to calculate, in accordance with a particular calculation expression, a sensitivity degree of the first personal data representing a quantified degree of effect caused for the first user if the first personal data is leaked, and
the determination is performed based on the calculated sensitivity degree of the first personal data.

5. The information provision apparatus according to claim 4, wherein
the determination includes determining that the providing of the first personal data is permitted when the calculated sensitivity degree of the first personal data is not more than a second threshold.

6. A computer-implemented information provision method comprising:
storing, for each user of a plurality of users, personal data obtained in a plurality of time points, the personal data obtained in at least any one of the plurality of time points being associated with approval information indicating a positive status or a negative status of approval for providing the personal data, the personal data including a plurality of items with respect to that user;
in response to receiving a request for the personal data of a first user from a terminal device, obtaining a determination result by determining, for each of the plurality of items, whether there is difference between first personal data and second personal data, the first personal data being the personal data of the first user stored at a first time point, the second personal data being the personal data of the first user stored at a second time point before the first time point, the second personal data being associated with the approval information indicating the positive status of approval for providing the second personal data of the first user, the first personal data having been not yet associated with the approval information indicating the positive status of approval for providing the first personal data of the first user;
in response to the determination result indicating that the difference between the first personal data and the second personal data exists in one or more items from among the plurality of items, obtaining, for a respective item of the one or more items, a first group of the personal data from among the personal data stored in a memory in association with the plurality of users other than the first user, the first group of the personal data as to the plurality of users other than the first user being plural pieces of the personal data each of which has the respective item same as the first personal data of the first user;
in response to the obtaining of the first group, calculating, for each of the one or more items, a ratio that is a proportion of a second group relative to the first group by dividing an amount of the second group by an amount of the first group, the second group being plural pieces of the personal data in the first group which has been associated with the approval information indicating the negative status of approval;

in a case where for all of the one or more items, the calculated ratio is less than a predetermined threshold, transmitting the first personal data to the terminal device; and in a case where for any of the one or more items, the calculated ratio is not less than the predetermined threshold, transmit to the first user a request to request approval for providing the first personal data.

7. The information provision method according to claim 6, wherein, the determination includes determining that the providing of the first personal data is permitted when the difference is not more than a first threshold.

8. The information provision method according to claim 7, wherein the determination includes determining that the providing of the first personal data is not permitted when the difference is more than the first threshold, and the information provision method is further comprising, when it is determined that the providing of the first personal data is not permitted, transmitting, to the first user, another request for confirming approval for the providing of the first personal data.

9. The information provision method according to claim 6, further comprising:

calculating, in accordance with a particular calculation expression, a sensitivity degree of the first personal data representing a quantified degree of effect caused for the first user if the first personal data is leaked, and wherein the determination is performed based on the calculated sensitivity degree of the first personal data.

10. The information provision method according to claim 9, wherein the determination includes determining that the providing of the first personal data is permitted when the calculated sensitivity degree of the first personal data is not more than a second threshold.

11. A non-transitory computer-readable medium storing instructions executable by one or more computers, the instructions comprising:

one or more instructions for storing, for each user of a plurality of users, personal data obtained in a plurality of time points, the personal data obtained in at least any one of the plurality of time points being associated with approval information indicating a positive status or a negative status of approval for providing the personal data, the personal data including a plurality of items with respect to that user;

one or more instructions for, in response to receiving a request for the personal data of a first user from a terminal device, obtaining a determination result by determining, for each of the plurality of items, whether there is difference between first personal data and second personal data, the first personal data being the personal data of the first user stored at a first time point, the second personal data being the personal data of the first user stored at a second time point before the first time point, the second personal data being associated with the approval information indicating the positive status of approval for providing the second personal data of the first user, the first personal data having been not yet associated with the approval information indicating the positive status of approval for providing the first personal data of the first user;

one or more instructions for, in response to the determination result indicating that the difference between the first personal data and the second personal data exists in one or more items from among the plurality of items, obtaining, for a respective item of the one or more items, a first group of the personal data from among the personal data stored in a memory in association with the plurality of users other than the first user, the first group of the personal data as to the plurality of users other than the first user being plural pieces of the personal data each of which has the respective item same as the first personal data of the first user;

one or more instructions for, in response to the obtaining of the first group, calculating, for each of the one or more items, a ratio that is a proportion of a second group relative to the first group by dividing an amount of the second group by an amount of the first group, the second group being plural pieces of the personal data in the first group which has been associated with the approval information indicating the negative status of approval;

one or more instructions for, in a case where for all of the one or more items, the calculated ratio is less than a predetermined threshold, transmitting the first personal data to the terminal device; and one or more instructions for, in a case where for any of the one or more items, the calculated ratio is not less than the predetermined threshold, transmit to the first user a request to request approval for providing the first personal data.

* * * * *